(12) United States Patent
Yegani et al.

(10) Patent No.: US 7,657,259 B2
(45) Date of Patent: Feb. 2, 2010

(54) OPTIMAL HOME AGENT ALLOCATION

(75) Inventors: Parviz Yegani, Danville, CA (US);
Timothy P. Stammers, Raleigh, NC (US); Jayaraman Iyer, Sunnyvale, CA (US); Anand K. Oswal, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 23 days.

(21) Appl. No.: 11/708,126

(22) Filed: Feb. 16, 2007

(65) Prior Publication Data
US 2007/0202873 A1 Aug. 30, 2007

Related U.S. Application Data

(60) Provisional application No. 60/780,176, filed on Mar. 6, 2006, provisional application No. 60/774,493, filed on Feb. 17, 2006.

(51) Int. Cl.
*H04W 4/00* (2006.01)
(52) U.S. Cl. ............... 455/432.1; 370/331; 370/338
(58) Field of Classification Search ............ 455/433; 370/331, 338
See application file for complete search history.

(56) References Cited

U.S. PATENT DOCUMENTS

| 7,382,748 | B1 * | 6/2008 | Bharatia et al. ............ 370/331 |
| 2003/0142650 | A1 | 7/2003 | Fan | |
| 2006/0067271 | A1 * | 3/2006 | Chen et al. ............ 370/331 |

OTHER PUBLICATIONS

3rd Generation Partnership Project 2 "3GPP2", cdma2000 Wireless IP Network Standard: Introduction, Version 1.0, Feb. 2006 3GPP2 X.S0011-001-D.

3rd Generation Partnership Project 2 "3GPP2", cdma2000 Wireless IP Network Standard: Simple IP and Mobile IP Access Services, Version 1.0, Feb. 2006 3GPP2 X.S0011-002-D.

3rd Generation Partnership Project 2 "3GPP2", cdma2000 Wireless IP Network Standard: Data Mobility and Resource Management, Version 1.0, Feb. 2006 3GPP2 X.S0011-003-D.

3rd Generation Partnership Project 2 "3GPP2", cdma2000 Wireless IP Network Standard: Quality of Service and Header Reduction, Version 1.0, Feb. 2006 3GPP2 X.S0011-004-D.

3rd Generation Partnership Project 2 "3GPP2", cdma2000 Wireless IP Network Standard: Accounting Services and 3GPP2 Radius VSAs, Version 1.0, Feb. 2006 3GPP2 X.S0011-005-D.

3rd Generation Partnership Project 2 "3GPP2", cdma2000 Wireless IP Network Standard: PrePaid Packet Data Services, Version 1.0, Feb. 2006 3GPP2 X.S0011-006-D.

* cited by examiner

*Primary Examiner*—George Eng
*Assistant Examiner*—Wesley L Kim
(74) *Attorney, Agent, or Firm*—Brian N. Young; Trellis IP Law Group, PC

(57) ABSTRACT

Particular embodiments provide an optimal allocation of a bearer manager or home agent. In one embodiment, a message is received from a mobile node requesting access to a visiting network that is different from a home network for the mobile node. An authentication request is sent to the home network requesting authentication for access. The authentication request indicates that a home agent has not been assigned. The home AAA server then sends a response that indicates the visiting AAA server can assign a home agent for the mobile node. The visiting AAA server then assigns a home agent that is optimally determined. The visiting home agent is different from a home agent that is found in the mobile node's home network. When a registration request is received, an IP gateway may send the registration request to the visiting home agent, which may not be sent back to the home network.

20 Claims, 4 Drawing Sheets

OPTIMAL HOME AGENT ALLOCATION

CROSS REFERENCES TO RELATED APPLICATIONS

This application claims priority from U.S. Provisional Patent application Ser. No. 60/774,493 filed on Feb. 17, 2006, and U.S. Provisional Patent application Ser. No. 60/780,176 filed on Mar. 6, 2006, both of which are hereby incorporated by reference in their entirety for all purposes.

TECHNICAL FIELD

Particular embodiments generally relate to wireless networking.

BACKGROUND

In wireless networks, a home agent (HA) or bearer manager (BM) is assigned by a home network for a mobile node. For example, a mobile node may be associated with a home network and the mobile node may roam to other networks in different areas that are referred to as visiting networks. The mobile node may attach to the visiting network through an Internet Protocol gateway (IPGW) and request access to the network. The visiting network may authenticate the mobile node through the authentication, authorization, and accounting (AAA) domain. For example, a visiting AAA server may send an access request to a home AAA server in the mobile node's home network. The request indicates that a home agent address has not been assigned. The home AAA server then responds with a AAA access accept message that includes the allocated home agent address. This address is for a home agent in the mobile node's home network. Accordingly, the mobile node's home agent may now be used to route packets to and from the mobile node. The mobile node will then register with the home agent in its home network. During communications, packets may be routed through the home network for the mobile node. When the mobile node is roaming in a visiting network, latency may be introduced by having packets for/from the mobile node routed through the home agent in the home network. For example, the mobile node may not be located near the home network; e.g., the home network may be in New York but the mobile node may be located in San Francisco. Accordingly, some latency may be introduced in communications because packets are routed from San Francisco to the home network in NY and vice versa. This may cause problems in latency sensitive services, such as in real-time services (Voice over Internet protocol (VoIP), streaming video, etc.).

DESCRIPTION OF EXAMPLE EMBODIMENTS

Overview

Particular embodiments provide an optimal allocation of a bearer manager or home agent. In one embodiment, a message is received from a mobile node requesting access to a visiting network that is different from a home network for the mobile node. An authentication request is sent to the home network requesting authentication for access. The authentication request indicates that a home agent has not been assigned. In one example, a visiting AAA server may send an access request to a home AAA server. The home AAA server then sends a response that indicates the visiting AAA server can assign a home agent for the mobile node. The visiting AAA server then assigns a home agent that is optimally determined. For example, a visiting home agent in the visiting network is assigned to the mobile node. The visiting home agent is different from a home agent that is found in the mobile node's home network. For example, the visiting home agent may be closer in proximity to the mobile node than the mobile node's home agent. When a registration request is received, an IP gateway may send the registration request to the visiting home agent. This registration request may not be sent back to the home network. Accordingly, latency may be reduced by not routing packets through the home network. Further, communications for the mobile node may now be routed through the visiting home agent as if it was the assigned home agent in the home network.

Example Embodiments

Figure 1:
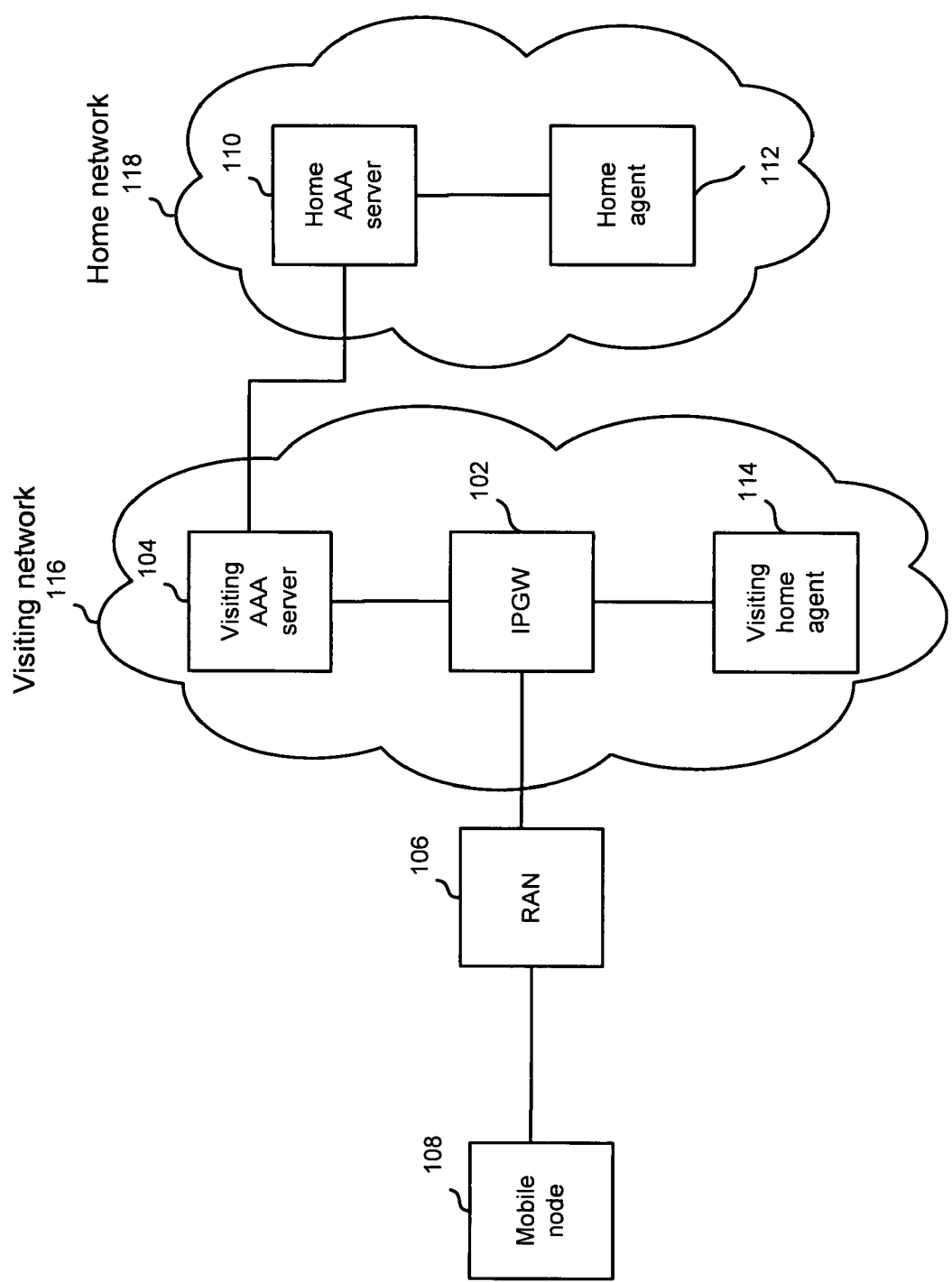
FIG. 1 shows an example of a system for optimally allocating a home agent.

FIG. 1 shows an example of a system for optimally allocating a home agent. As shown, a visiting network 116 and a home network 118 are provided. Visiting network 116 includes an IP gateway 102, visiting AAA server 104, and a visiting home agent 114. Home network 118 includes a home AAA server 110 and a home agent 112. Further, a mobile node 108 may attempt to connect to visiting network 116 through a radio access network (RAN) 106. Although functions are described as being performed by different entities in the system, it will be understood that functions may be performed by other entities than that described.

Home network 118 may be a permanent home network that is assigned to mobile node 108. For example, home network 118 may have a network prefix matching that of a mobile node's home address. Conventionally, standard IP routing mechanisms will deliver packets destined for a mobile node's home address to the mobile node's home network.

Visiting network 116 may be a different network from home network 118. For example, visiting network 116 may be a network in a different location from home network 118.

Mobile node 108 may be any mobile node, such as a cellular telephone, mobile e-mail device, laptop computer, personal digital assistant (PDA), smart telephone, etc. Although a mobile node is described, it will be understood that mobile node 108 may include a fixed device also. Mobile node 108 may also be referred to as an access terminal.

Mobile node 108 may connect wirelessly to visiting network 116. For example, mobile node 108 connects through a radio access network 106, which may include a base station, and other components that enable layer 2 mobile access and over-the-air communication. Although a wireless network is described, mobile node 108 does not have to connect through a wireless network. Rather, mobile node 108 may connect through a wireline network, such as a local area network, etc.

When mobile node 108 roams to a network other than home network 118, mobile node 108 will send an access request to the visited network. For example, mobile node 108 sends an access request through radio access network 106 and it is received at IP gateway 102. IP gateway 102 is configured to interface with other networks, i.e., between the RAN layer 2 network and the IP layer 3 network. A home agent is typically assigned to mobile node 108. The home agent may be a bearer manager that provides bearer related services and functionality, such as mobility services, admission control, QoS, etc.

The access request from mobile node 108 needs to be authenticated before mobile node 108 is allowed to access visiting network 116. In one embodiment, AAA servers are used to authenticate mobile node 108. Although AAA servers are described, it will be understood that other methods of authentication may be used. Further, the protocol remote authentication dial-in user service (RADIUS) may be used for sending authentication messages. However, it will be understood that other protocols may be used, such as DIAMETER terminal access controller access-control system (TACACS), etc. may be used.

Visiting AAA server 104 is a AAA server that is in visiting network 116. IP gateway 102 sends the access request to visiting AAA server 104, which can then forward the access request to home AAA server 110 for authentication. In sending the access request, visiting AAA server indicates that a home agent has not been allocated for mobile node 108.

Home AAA server 110 then determines if it should assign a home agent in home network 118. For example, it might be desirable that a home agent in visiting network 116 be assigned for different reasons. This may be because visiting network 116 is closer to mobile node 108 and thus less latency would result in communicating with a home agent in visiting network 116 than communicating with a home agent in home network 118. Further, having a home agent in visiting network would alleviate unnecessary roundtrips back through home network 118. For example, messages would have to be routed through visiting network 116 to the home agent in home network 118, and then back to visiting network 116 to mobile node 108 if a home agent in home network 118 is assigned.

Home AAA server 110 may thus decide that home agent 112 is not an optimal home agent for mobile node 108. Home AAA server 110 sends an access response to visiting AAA server 104 that may indicate whether or not mobile node 108 has been authenticated. Further, if mobile node 108 has been authenticated, the response may indicate that visiting AAA server 104 can assign a visiting home agent for mobile node 108. In this case, visiting AAA server 104 may assign a visiting home agent that is determined to be optimal for mobile node 108. This visiting home agent may take the place of a home agent in home network 118 that was conventionally assigned. In one embodiment, visiting AAA server 104 assigns a visiting home agent 114 that is closest in location to mobile node 108. In other particular embodiments, different factors may also be taken into account, such as latency, load, etc. to assign a visiting home agent 114. By having visiting network 116 assign a visiting home agent, latency in communicating with visiting home agent 114 may be reduced. Although visiting home agent 114 is shown as being part of visiting network 116, it will be understood that a visiting home agent may be assigned in any visiting network.

Visiting AAA server 104 then sends a response to IP gateway 102 that includes an address for visiting home agent 114. IP gateway 102 may then store the address in storage (e.g., cache). A response to the access request is then sent to mobile node 108 indicating that it has been authenticated.

After authentication, mobile node 108 may want to register with visiting network 116. IP gateway 102 receives a registration request from mobile node 108. IP gateway 102 first determines where to send the registration request, such as to visiting home agent 114 that was assigned. In this case, an address for visiting home agent 114 is determined from the cache and the registration request is routed to it. The registration process is then completed with visiting home agent 114 as it would have been if home agent 112 was assigned to be the home agent. However, in this case, visiting home agent 114 becomes the home agent for mobile node 108. Thus, when messages in the registration process are received for mobile node 108, they do not go through home agent 112 but rather go through visiting home agent 114. This reduces latency in the registration process to set up the connection because visiting home agent 114 may be closer to mobile node 108.

Further, using visiting home agent 114 may save latency in the bearer path in that messages are not sent through home network 118. For example, if mobile node 108 has roamed to a location that is far away from home network 118, it is not desirable to send messages through visiting network 116 to home network 118, and possibly back. In one example, if mobile node 108 wants to initiate a call with another mobile node attached to visiting network 116, sending communications from visiting network 116 through home network 118 and back to visiting network 116 is not desirable. Rather, having mobile node 108 communicate through visiting home agent 114 and visiting network 116 is more efficient. This may be important for delay-sensitive applications such as VoIP, video streaming applications, etc. For example, packets flowing through visiting network 116 through home network 118 may cause latency that may affect the quality of the data being delivered, such as a video being played. However, by using visiting home agent 114 as the home agent for mobile node 108, this latency is avoided.

Figure 2:
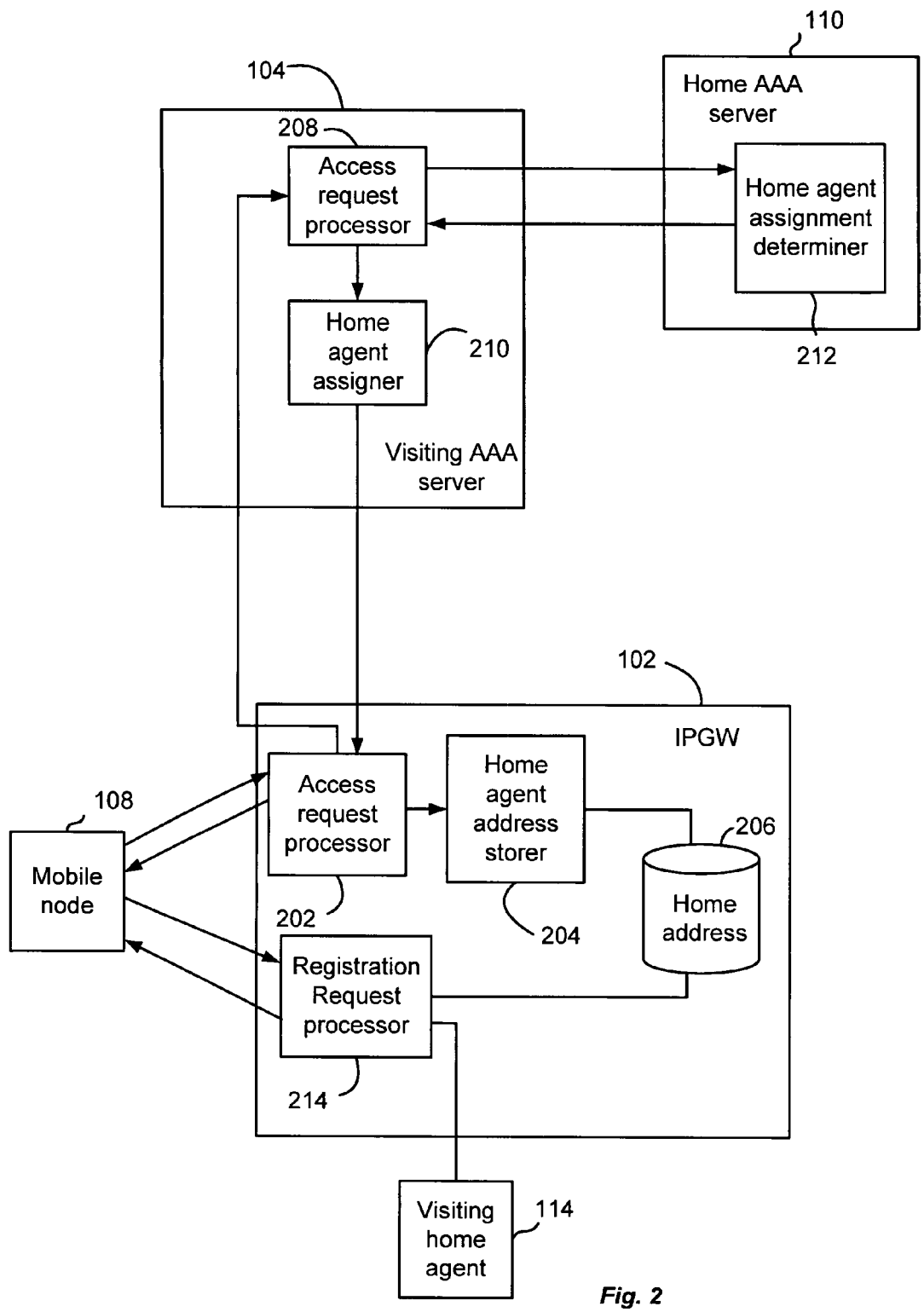
FIG. 2 shows a more detailed embodiment of the system shown in FIG. 1.

FIG. 2 shows a more detailed embodiment of the system shown in FIG. 1. As shown, IP gateway 102 includes an access request processor 202, a home agent address storer 204, storage 206, and a registration request processor 214. Visiting AAA server 104 includes an access request processor 208, and a home agent assigner 210.

Mobile node 108 may first send an access request to IP gateway 102. Access request processor 202 then determines mobile node 108 needs to be authenticated and sends a request to visiting AAA server 104. Access request processor 208 may then send an access request to home AAA server 110. This message may include a parameter that includes a home agent (HA) field that equals 0, or another arbitrary number that indicates that a home agent has not been assigned. For example, the address in the home agent field may be 0.0.0.0 or 255.255.255.255.

A home agent assignment determiner 212 then determines if home AAA server 110 should assign a home agent in home network 118 or allow visiting network 116 to assign a home agent. In this case, it is determined that visiting network 116 should optimally assign a home agent. Accordingly, a AAA Access-Accept message with an indication that visiting network 116 should assign the home agent is sent.

Access request processor 208 receives the response and then home agent assigner 210 determines a visiting home agent 114 to assign to mobile node 108. For example, a home agent closest in location to mobile node 108 is determined. A visiting home agent address is determined and sent to home agent address storer 204. The visiting home agent address may then be cached or stored in storage 206 in IP gateway 102. Request processor 202 may then send an access response to mobile node 108 indicating that it has been authenticated for access to visiting network 116.

Mobile node 108 may then send a registration request (RRQ) to IP gateway 102. When request processor 202 receives the registration request, it determines if a home agent has been assigned to mobile node 108. In this case, the visiting home agent address stored in storage 206 is determined. Registration request processor 202 then routes the registration request to visiting home agent 114 at the stored home agent address. Accordingly, visiting home agent 114 may then be used as the home agent for mobile node 108 in communications.

Figure 3:
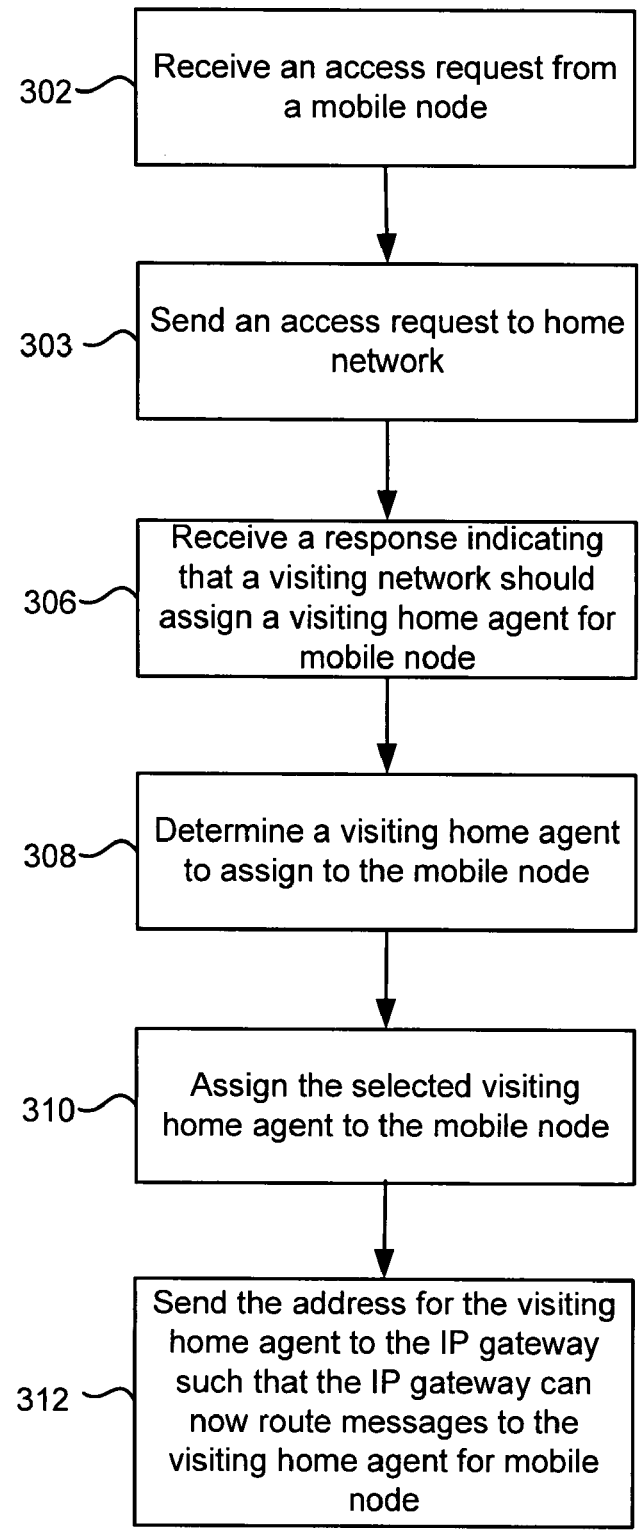
FIG. 3 depicts a method for assigning an optimal home agent.

FIG. 3 depicts a method for assigning an optimal home agent. Step 302 receives an access request from mobile node 108. The access request indicates that a home agent has not been assigned to mobile node 108.

Step 304 sends an access request to home network 118. Home network 118 may then process the request to determine if a home agent in home network 118 should be assigned. Assuming that a home agent in home network 118 is not assigned in the home network, a response is sent back to visiting network 116 indicating that visiting network 116 should assign the home agent.

Step 306 receives the response indicating that visiting network 116 should assign a visiting home agent 114 for mobile node 108.

Step 308 determines a visiting home agent 114 to assign to mobile node 108. For example, different visiting home agents are determined and an optimal one is selected.

Step 310 then assigns the selected visiting home agent 114 to mobile node 108. Step 312 sends the address for visiting home agent 114 to IP gateway 102 such that IP gateway 102 can now route messages to visiting home agent 114 for mobile node 108.

Figure 4:
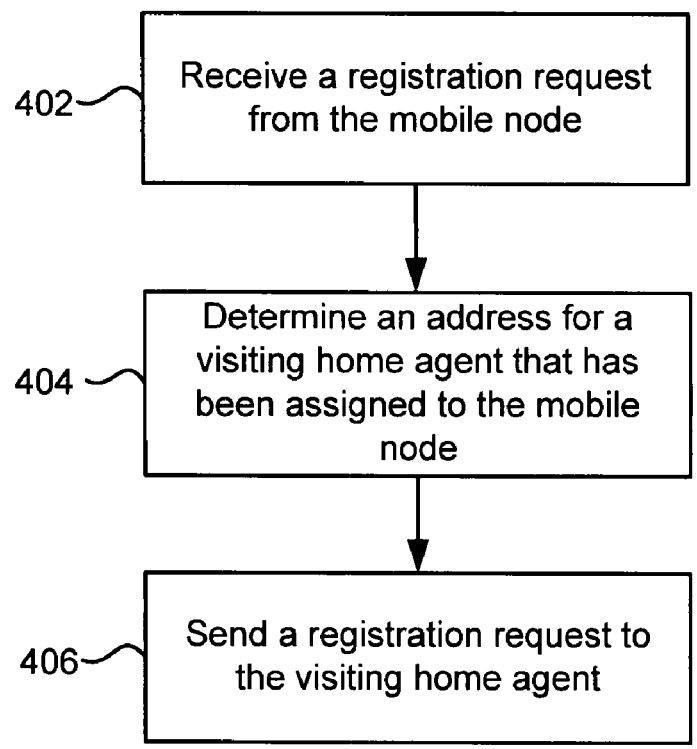
FIG. 4 shows an example of routing messages for a mobile node.

Once the home agent is selected, IP gateway 102 can facilitate routing messages for mobile node 108. FIG. 4 shows an example of routing messages for mobile node 108. Step 402 receives a registration request from mobile node 108. The registration request may indicate that a home agent has not been assigned.

Step 404 determines an address for a visiting home agent 114 that has been assigned to mobile node 108. This may have been cached from the message sent from visiting AAA server 104.

Step 406 sends a registration request to visiting home agent 114. Visiting home agent 114 then facilitates the registration process. Messages can be routed by visiting home agent 114 as if it were home agent 112 in home network 118. Accordingly, any messages that previously would have gone through home agent 112 are now routed through visiting home agent 114. These messages do not have to go through home network 118.

Accordingly, particular embodiments provide many advantages. For example, the bearer path is optimized in that round trips to a home network 118 are not necessary. Rather, data can flow through visiting network 116 without going through home network 118. Also, a connection may be set up with low latency. For example, once visiting home agent 114 is assigned, it can handle the setup for mobile node 108 without any contact with home network 118. Also, the home agent is assigned during a AAA authentication and thus, no extra round trips to home AAA server 110 are needed after visiting home agent 114 is assigned.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
   receiving a first message requesting access to a visiting network different from a home network for a mobile node, the home network including a home agent for the mobile node;
   sending a second message to the home network, the second message including a value for a home agent field indicating a home agent has not been assigned, the home agent field being a field configured for an address of the home agent assigned to the mobile node;
   receiving a response from the home network indicating that the visiting home agent should be assigned by an entity in the visiting network, the home network interpreting the value as an indication to determine if the home network or the visiting network should assign the home agent;
   determining, at the entity in the visiting network, a visiting home agent to assign to the mobile node after receiving the response from the home network indicating the entity in the visiting network should assign the visiting home agent, the visiting home agent different from the mobile node's home agent in the home network, wherein a visiting home agent address different for the value for the home agent field is determined before a registration request is received from the mobile node, the value not identifying the assigned visiting home agent; and
   causing assignment of the visiting home agent address to the mobile node instead of the mobile node's home agent in the home network such that communications sent to and from the mobile node are directed through the visiting home agent instead of the mobile node's home agent in the home network, the assignment of the visiting home agent address occurring upon receipt of the registration request from the mobile node.

2. The method of claim 1, wherein the visiting home agent is a home agent optimally chosen to reduce latency in communications with the mobile node.

3. The method of claim 1, wherein the authentication message is sent through a visiting AAA server to a home AAA server, wherein the home AAA server responds with the response.

4. The method of claim 1, further comprising:
   storing an address for the visiting home agent;
   receiving a registration request from the mobile node; and
   sending the registration request to the visiting home agent instead of the mobile node's home network.

5. The method of claim 1, wherein the received response is an authentication message for the mobile node.

6. The method of claim 1, wherein the visiting home agent facilitates establishing a bearer path for the mobile node instead of the mobile node's home agent.

7. The method of claim 1, wherein the visiting home agent receives packets destined for the mobile node without having them routed through the home network.

8. The method of claim 1, wherein a AAA server assigns the visiting home agent.

9. An apparatus comprising:
   one or more computer processors; and
   logic encoded in one or more computer readable media for execution by the one or more computer processors and when executed operable to:
   receive a first message requesting access to a visiting network different from a home network for a mobile node, the home network including a home agent for the mobile node;
   send a second message to the home network, the second message including a value for a home agent field indicating a home agent has not been assigned, the home agent field being a field configured for an address of the home agent assigned to the mobile node;
   receive a response from the home network indicating that the visiting home agent should be assigned by the apparatus in the visiting network, the home network interpreting the value as an indication to determine if the home network or the visiting network should assign the home agent;
   determine, at the apparatus in the visiting network, a visiting home agent to assign to the mobile node after receiving the response from the home network indicating the entity in the visiting network should assign the visiting home agent, the visiting home agent different from the mobile node's home agent in the home network, wherein a visiting home agent address different from the value for the home agent field is determined before a registration request is received from the mobile node, the value not identifying the assigned visiting home agent; and
   cause assignment of the visiting home agent address to the mobile node instead of the mobile node's home agent in the home network such that communications sent to and from the mobile node are directed through the visiting home agent instead of the mobile node's home agent in the home network, the assignment of the visiting home agent address occurring upon receipt of the registration request from the mobile node.

10. The apparatus of claim 9, wherein the visiting home agent is a home agent optimally chosen to reduce latency in communications with the mobile node.

11. The apparatus of claim 9, wherein the authentication message is sent through a visiting AAA server to a home AAA server, wherein the home AAA sewer responds with the response.

12. The apparatus of claim 9, wherein the logic when executed is further operable to:
store an address for the visiting home agent;
receive a registration request from the mobile node; and
send the registration request to the visiting home agent instead of the mobile node's home network.

13. The apparatus of claim 9, wherein the received response is an authentication message for the mobile node.

14. The apparatus of claim 9, wherein the visiting home agent facilitates establishing a bearer path for the mobile node instead of the mobile node's home agent.

15. The apparatus of claim 9, wherein the visiting home agent receives packets destined for the mobile node without having them routed through the home network.

16. The apparatus of claim 9, wherein a AAA sewer assigns the visiting home agent.

17. An apparatus comprising:
means for receiving a first message requesting access to a visiting network different from a home network for a mobile node, the home network including a home agent for the mobile node;
means for sending a second message to the home network, the second message including the value for a home agent field indicating a home agent has not been assigned, the home agent field being a field configured for an address of the home agent assigned to the mobile node;
means for receiving a response from the home network indicating that the visiting home agent should be assigned by the apparatus in the visiting network, the home network interpreting the value as an indication to determine if the home network or the visiting network should assign the home agent;
means for determining, at the apparatus in the visiting network, a visiting home agent to assign to the mobile node after receiving the response from the home network indicating the entity in the visiting network should assign the visiting home agent, the visiting home agent different from the mobile node's home agent in the home network, wherein a visiting home agent address different from the value for the home agent field is determined before a registration request is received from the mobile node, the value not identifying the assigned visiting home; and
means for causing assignment of the visiting home agent address to the mobile node instead of the mobile node's home agent in the home network such that communications sent to and from the mobile node are directed through the visiting home agent instead of the mobile node's home agent in the home network, the assignment of the visiting home agent address occurring upon receipt of the registration request from the mobile.

18. The method of claim 1, wherein the entity in the visiting network makes the an initial determination of assigning the visiting home agent.

19. The method of claim 1, wherein the access request is for authentication of the mobile node.

20. A system comprising:
a visiting network device in a visiting network;
a home network device in a home network, the home network including a home agent for the mobile node;
an authentication device configured to
receive a first message requesting access to the visiting network different from the home network for a mobile node;
send a second message to the home network device, the second message including a value for a home agent field indicating a home agent has not been assigned, the home agent field being a field configured for an address of the home agent assigned to the mobile node;
receiving a response from the home network device indicating that the visiting home agent should be assigned by an entity in the visiting network, the home network device interpreting the value as an indication to determine if the home network or the visiting network should assign the home agent;
determine a visiting home agent to assign to the mobile node after receiving the response from the home network indicating the entity in the visiting network should assign the visiting home agent, the visiting home agent different from the mobile node's home agent in the home network, wherein a visiting home agent address different from the value for the home agent field is determined before a registration request is received from the mobile node, the value not identifying the assigned visiting home agent; and
send the visiting home agent address to the visiting network device,
wherein the visiting network device is configured to:
store the home agent address; and
upon receipt of the registration request from the mobile node, retrieve the home agent address and assign the home agent address to the mobile node instead of the mobile node's home agent in the home network such that communications sent to and from the mobile node are directed through the visiting home agent instead of the mobile node's home agent in the home network.

* * * * *